United States Patent [19]

Kawata et al.

[11] Patent Number: 5,636,049
[45] Date of Patent: Jun. 3, 1997

[54] MECHANISM FOR SCANNING THE INNER PERIPHERY OF A DRUM INCLUDED IN AN IMAGE FORMING APPARATUS

[75] Inventors: Seiji Kawata; Yuzo Ono, both of Tokyo, Japan

[73] Assignee: NEC Corporation, Tokyo, Japan

[21] Appl. No.: 520,183

[22] Filed: Aug. 28, 1995

[30] Foreign Application Priority Data

Aug. 26, 1994 [JP] Japan .................................. 6-201651

[51] Int. Cl.⁶ .................................................. G02B 26/08
[52] U.S. Cl. .......................... 359/211; 359/204; 359/209; 359/210; 359/220
[58] Field of Search ............................. 359/201, 203, 359/204, 209, 210, 211, 212, 213, 214, 215, 831, 837, 220; 358/493, 474, 296; 348/202, 203; 347/233, 241, 243, 256–260

[56] References Cited

U.S. PATENT DOCUMENTS

| 4,637,679 | 1/1987 | Funato ........................ | 359/204 |
| 5,420,714 | 5/1995 | Zelenka ....................... | 359/211 |
| 5,481,384 | 1/1996 | Kramer et al. ............... | 359/211 |

FOREIGN PATENT DOCUMENTS 56-68364  6/1981  Japan .
1-155372  6/1989  Japan .

*Primary Examiner*—James Phan
*Attorney, Agent, or Firm*—Sughrue, Mion, Zinn, Macpeak & Seas

[57] ABSTRACT

In an image forming apparatus, a mechanism for scanning the inner periphery of a hollow cylindrical drum has stationary optics including two semiconductor lasers fixed in place. The two lasers have their p–n junction planes positioned perpendicular to each other, i.e., one of them is horizontal while the other is vertical. Lights from the lasers are combined on the same axis by a polarizing beam splitter. A quarter-wave plate has its optical axis inclined ±45 degrees relative to the direction of polarization. The combined wave from the beam splitter is transformed by the quarter-wave plate to light having a clockwise and a counterclockwise polarization overlapping each other on the same axis. In the rotary optics, another quarter-wave plate converts the incident light to a composite wave of linear polarizations perpendicular to each other. This composite wave is incident to a splitting element as a P wave and an S wave or as ordinary rays and extraordinary rays. As a result, the P wave and S wave or the ordinary rays and extraordinary rays are spatially separated into two beams for scanning a film in parallel.

5 Claims, 7 Drawing Sheets

MECHANISM FOR SCANNING THE INNER PERIPHERY OF A DRUM INCLUDED IN AN IMAGE FORMING APPARATUS

BACKGROUND OF THE INVENTION

The present invention relates to a mechanism for scanning the inner periphery of a hollow cylindrical drum included in an image forming apparatus.

Some of laser printers, laser plotters and facsimile apparatuses available today have a scanning mechanism of the type having stationary optics and rotary optics which is disposed in a hollow cylindrical drum. A film or similar photoconductive member is fitted on the inner periphery of the drum. The rotary optics is rotated at a high speed within the drum in order to scan the photoconductive member in the main scanning direction. The drum is moved in its axial direction or subscanning direction in synchronism with the rotation of the rotary optics. This type of scanning mechanism may be applied to a facsimile receiver for a newspaper transmission system, as disclosed in, for example, Japanese Utility Model Laid-Open Publication Nos. 56-68364 and 59-50155. The scanning mechanism may also be applied to an electrophotographic optical printer, as taught in Japanese Patent Laid-Open Publication No. 1-155372 by way of example. However, the problem with this scanning system is that the scanning speed is determined by the rotation speed of the rotary optics which is, in turn, limited by the performance of a motor for driving the optics, and the structural strength of the optics.

In light of the above, use may be made of a multi-beam laser having a plurality of light emitting points. With this kind of laser, it is possible to form a plurality of beam spots on the inner periphery of the drum and modulate them independently of each other. However, when the multi-beam laser is disposed in the rotary optics, it is difficult to supply power thereto. On the other hand, when the laser is disposed in the stationary optics, an image rotating mechanism is necessary in order to prevent scanning lines from intersecting each other on the inner periphery of the drum. While the image rotating mechanism is usually implemented by a Dove prism, the image rotation angle available with such a mechanism is double the rotation angle of the Dove prism, resulting in a complicated rotation mechanism.

SUMMARY OF THE INVENTION

It is, therefore, an object of the present invention to provide a scanning mechanism for the above application, and operable at a high scanning speed or printing speed.

It is another object of the present invention to provide a scanning mechanism for the above application, and capable of scanning the inner periphery of a hollow cylindrical drum with two independent beam spots to thereby enhance high-speed printing.

A mechanism for scanning the inner periphery of a hollow cylindrical drum of the present invention has rotary optics bodily rotatable for scanning the inner periphery of the drum with a beam spot, and stationary optics for feeding a laser beam to the axis of rotation of the rotary optics. The stationary optics has two lasers perpendicular to each other in linear polarization direction, a polarizing beam splitter for combining two beams from the two lasers on a single axis, and a quarter-wave plate for converting a composite beam, combined on the single axis, to a clockwise circular polarization and a counterclockwise circular polarization. The rotary optics has a quarter-wave plate for converting the clockwise and counterclockwise circular polarizations incident thereto to perpendicular linear polarizations, and a splitting element for spatially splitting the perpendicular linear polarizations into two beams.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
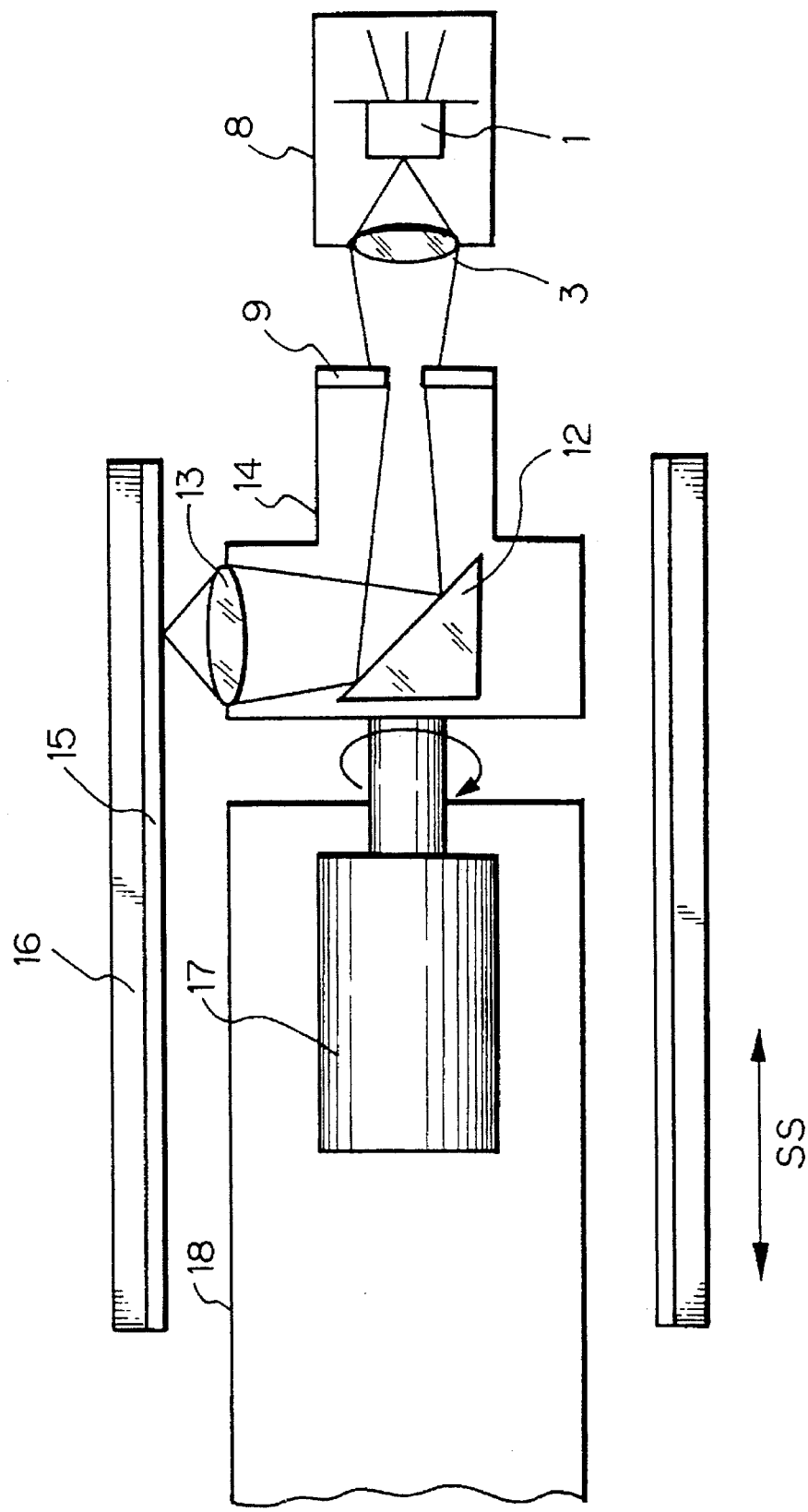
FIG. 1 is a section showing a conventional mechanism for scanning the inner periphery of a hollow cylindrical drum.

To better understand the present invention, a brief reference will be made to a conventional scanning mechanism of the type to which the present invention pertains, shown in FIG. 1. As shown, the scanning mechanism has stationary optics 8, rotary optics 14, a hollow cylindrical drum 16 accommodating the rotary optics 14, and a motor 17 mounted on a support 18 and for driving the rotary optics 14. In the stationary optics 8, light issuing from a semiconductor laser 1 is condensed or collimated by a lens 3. The light output from the lens 3 is incident to an aperture 9 located on the axis of rotation of the rotary optics 14. The light entered the rotary optics 14 via the aperture 9 is reflected by a mirror 12 perpendicularly to the axis of rotation. The light reflected by the mirror 12 is focused by a condenser lens 13 onto a film 15 fitted on the inner periphery of the drum 16. As a result, an image representative of the aperture 9 is formed on the film 15 and constitutes a single print dot. As the rotary optics 14 is rotated at a high speed by the motor 17 in a direction indicated by an arrow in the figure, such images or dots are sequentially formed or printed on the film 15 in the main scanning direction. The drum 16 is moved in its axial direction, or subscanning direction, SS in synchronism with the rotation of the optics 14. Consequently, dots are printed on the entire film 15. This type of mechanism is capable of forming square, oblong or similar rectangular dots on the film 15 if the aperture 9 is provided with a rectangular configuration, thereby forming a high quality image.

Figure 2:
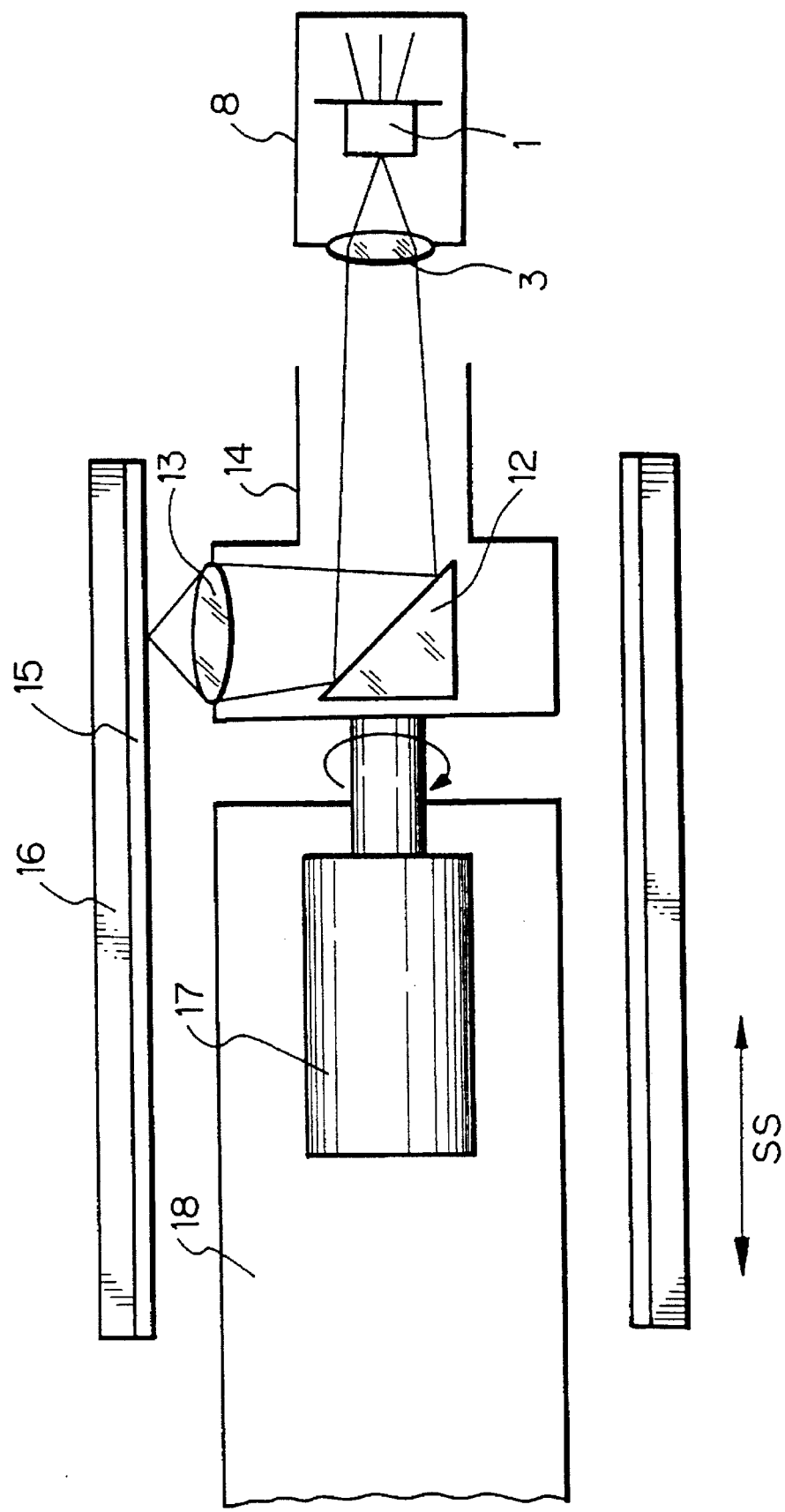
FIG. 2 is a section of another conventional scanning mechanism for the above application.

FIG. 2 shows another conventional scanning mechanism usable when rectangular dots are not necessary. In FIG. 2, the same constituent parts as the parts shown in FIG. 1 are designated by the same reference numerals. As shown, the light from the laser 1 is directly condensed onto the film 15 without the intermediary of the aperture 9.

However, the problem with the above conventional mechanisms is that the printing speed is determined by the rotation speed of the optics 14 which is, in turn, limited by the performance of the motor 17 and the structural strength of the optics 14, as discussed earlier.

Figure 3:
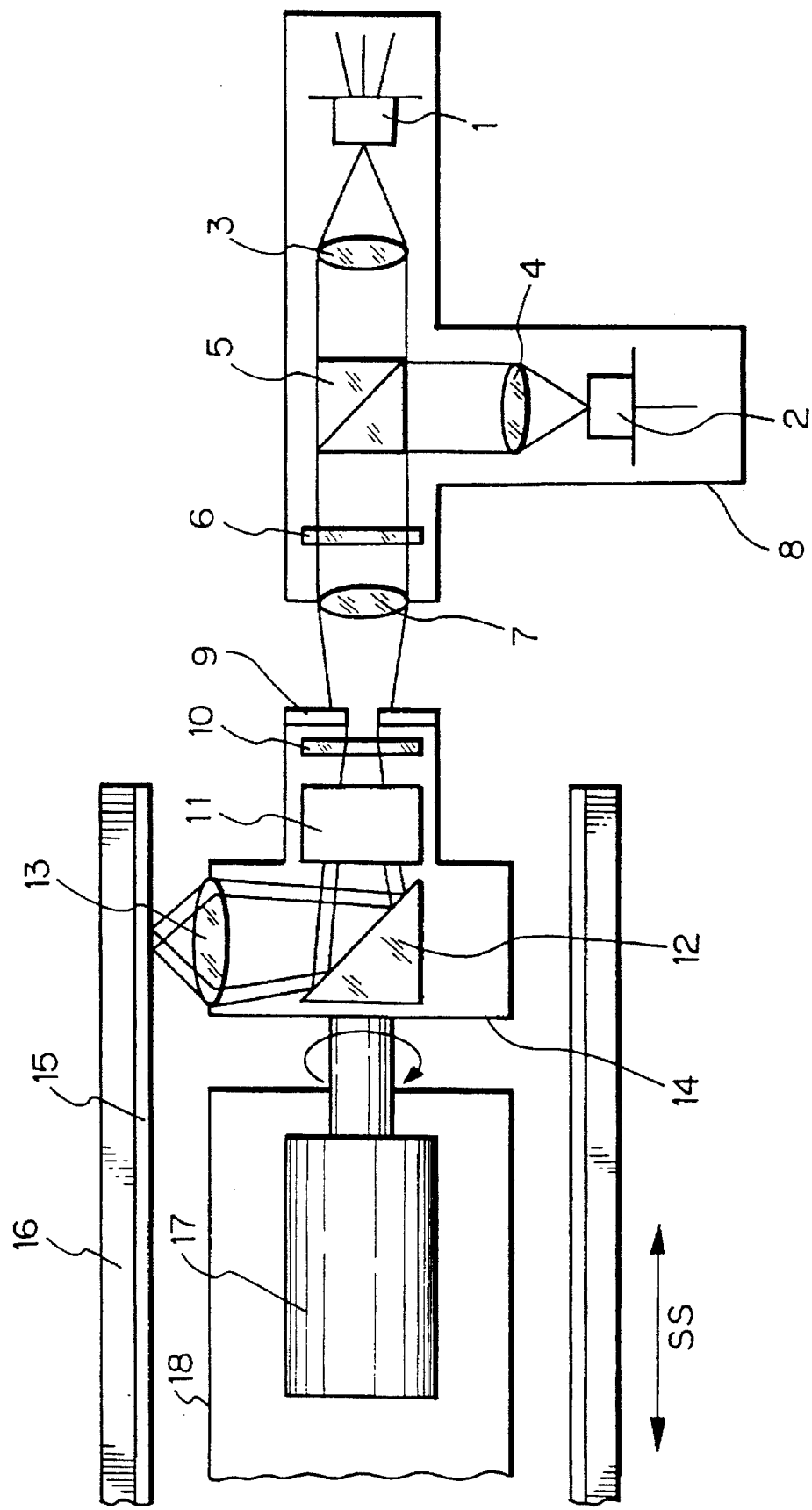
FIG. 3 is a section showing a scanning mechanism for the above application and embodying the present invention.

Referring to FIG. 3, a scanning mechanism embodying the present invention is shown which is applicable to a laser printer by way of example. In FIG. 3, the same or similar constituents as or to the constituents shown in FIGS. 1 and 2 are designated by the same reference numerals, and a detailed description thereof will not be made in order to avoid redundancy. As shown, the scanning mechanism has stationary optics 8, rotary optics 14, a hollow cylindrical drum 16, and a motor 17.

The stationary optics 8 includes semiconductor lasers 1 and 2 of the same standard and emitting in the TM mode. The lasers 1 and 2 have their p–n junction planes positioned perpendicularly to each other, i.e., one of them is horizontal while the other is vertical. Lights issuing from the lasers 1 and 2 are respectively collimated by lenses 3 and 4 and then incident to a polarizing beam splitter 5. The beam splitter 5 is of the type transmitting substantially a hundred percent of P wave and reflecting substantially a hundred percent of S wave. As a result, the lights from the lenses 3 and 4 are combined on the same axis by the beam splitter 5. The composite light is transmitted through a quarter-wave plate 6 whose optical axis is inclined 45 degrees relative to the direction of polarization. Hence, the light output from the quarter-wave plate 6 has a clockwise and a counterclockwise polarization overlapping each other on the same axis. The light from the plate 6 is incident to an aperture 9 by way of a condenser lens 7 for efficient use.

The light admitted into the rotary optics 14 via the aperture 9 is transmitted through a quarter-wave plate 10 fixed in place in the optics 14. As a result, the light turns out a composite wave of linear polarizations perpendicular to each other in the optics 14. The composite wave is incident to a splitting element 11 as a P wave and an S wave or as ordinary rays and extraordinary rays. The splitting element 11 spatially splits the input waves or rays into two beams. A mirror 12 reflects the two beams toward a condenser lens 13 in a direction perpendicular to the axis of rotation of the optics 14. The lens 13 condenses the incident beams onto a film 15 fitted on the inner periphery of the drum 16. Consequently, two beam spots which can be modulated independently of each other are formed on the film 15. The two beams incident to the film 15 each scans the film 15, being rotated at a high speed by the motor 17, in the main scanning direction. The drum 16 is moved in its axial direction, or subscanning direction, SS in synchronism with the rotation of the optics 14. As a result, dots are formed or printed on the entire surface of the film 15.

Figure 4:
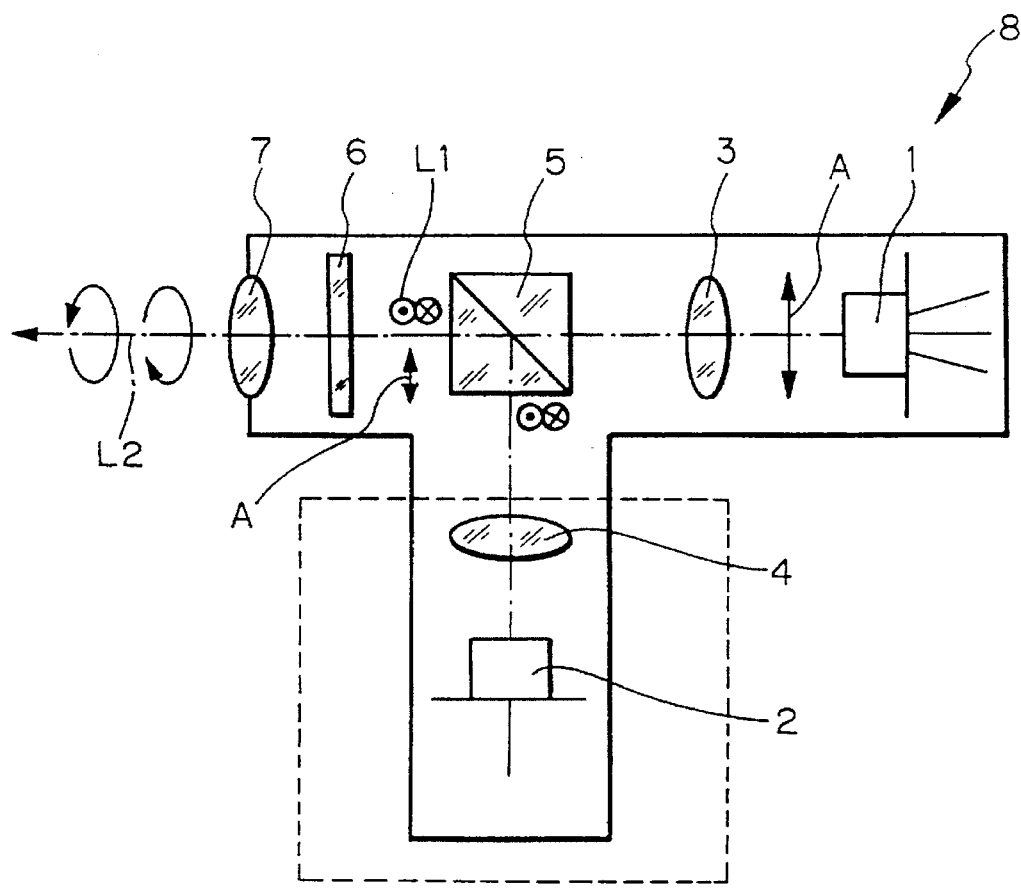
FIG. 4 is a section showing a specific configuration of stationary optics included in the embodiment.
Figure 5A:
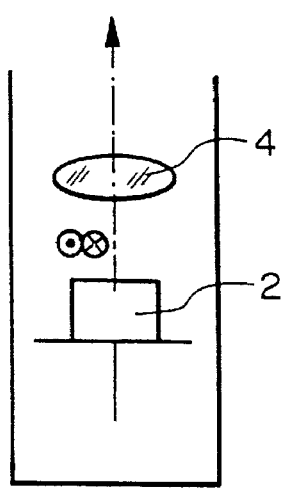
FIGS. 5A–5C are fragmentary sections each showing a specific configuration of part of the stationary optics of FIG. 4.
Figure 5B:
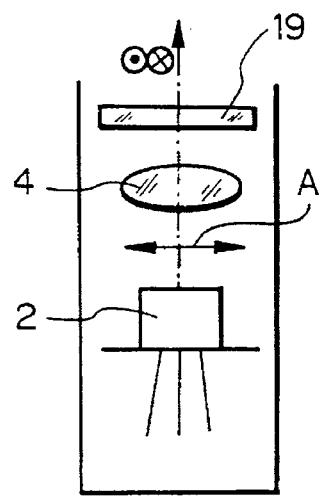
Figure 5C:
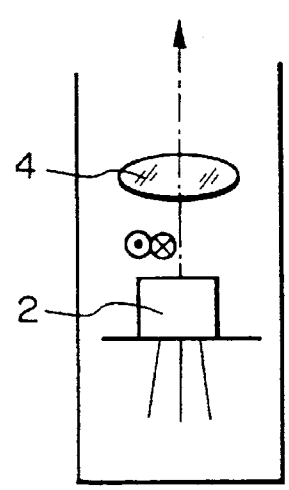

FIG. 4 shows a specific configuration of the stationary optics 8 included in the embodiment. As sown, the semiconductor laser 1 is implemented by an ordinary TM mode laser and positioned such that its p–n junction plane is horizontal, i.e., the plane shown in the sheet defines a direction of polarization, as indicated by a double-headed arrow A. The light from the laser 1 is collimated by the lens 3 and then incident to and transmitted through the beam splitter as a P wave. On the other hand, FIGS. 5A–5C each shows a specific arrangement for causing the light from the semiconductor laser 2 to be incident to the beam splitter 5 via the lens 4 as an S wave and reflected thereby, i.e., for attaining light whose polarization is perpendicular to the sheet surface, as indicated by a circle with a dot and a circle with a cross. In FIG. 5A, the laser 2 has the same structure as the laser 1, but the former is rotated 90 degrees relative to the latter. In FIG. 5B, the laser 2, identical in configuration with the laser 1, has its p–n junction plane held horizontally; the light from the laser 2 has its direction of polarization rotated 90 degrees by the quarter-wave plate 19. Further, in FIG. 5C, the laser 2 is of the type oscillating in the TE mode and has its p–n junction plane held vertically, so that a polarization perpendicular to the sheet surface is produced. The arrangement of FIG. 5C is, therefore, identical with the arrangement of FIG. 3.

Composite light L1, FIG. 4, output from the beam splitter 5 on the same axis and consisting of linear polarizations perpendicular to each other are transformed to light L2 made up of a clockwise and a counterclockwise polarization by the quarter-wave plate 6. The plate 6 has its optical axis deviated by ±45 degrees relative to the direction of polarization. The light L2 is incident to the rotary optics 14.

A reference will be made to FIGS. 6–8 for describing three specific configurations of the rotary optics 14. Because the functions of the aperture 9 and quarter-wave plate 10 have already been described with reference to FIG. 3, the following description will concentrate mainly on the splitting element 11 for the spatial separation of light.

Figure 6:
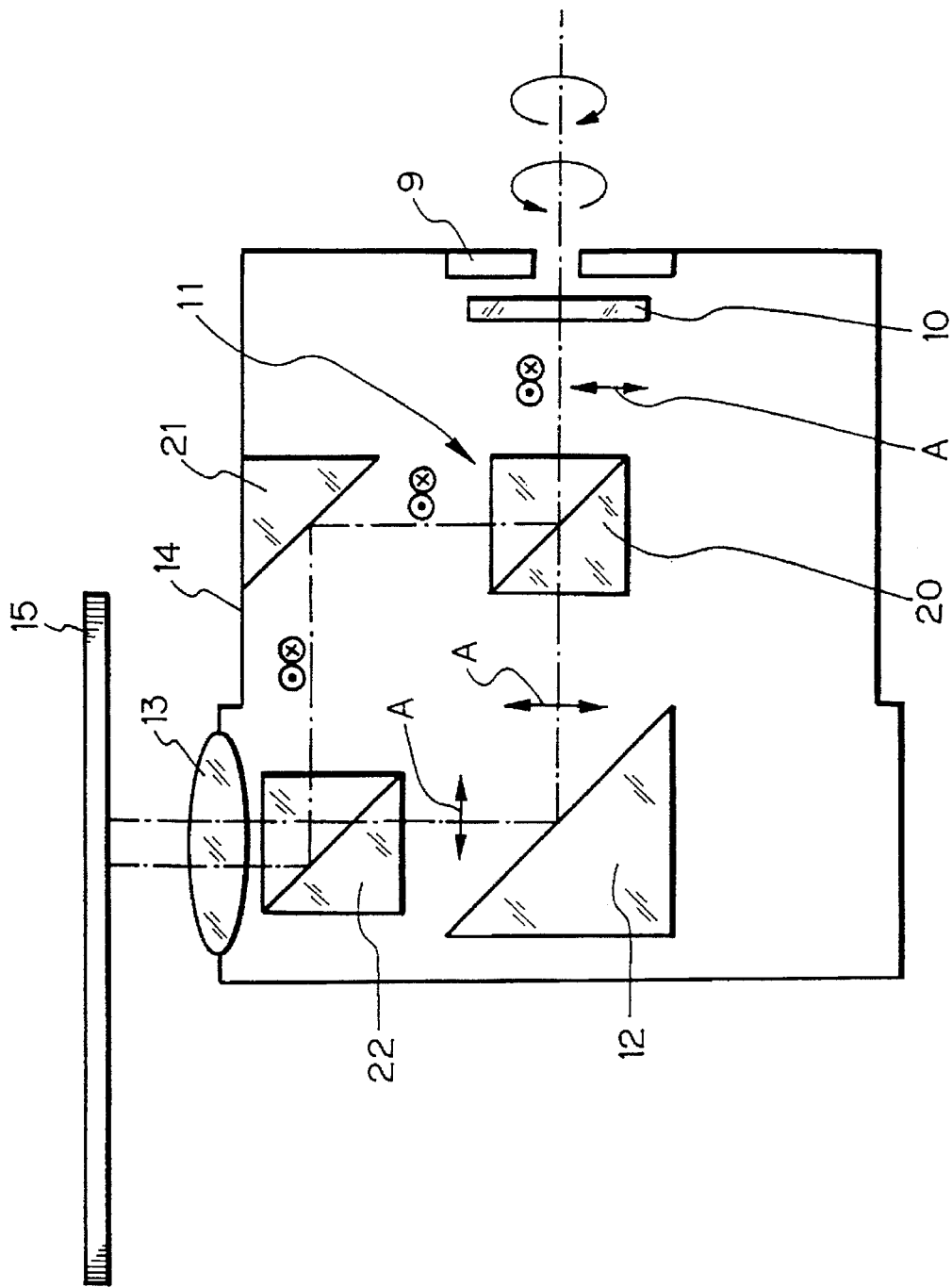
FIGS. 6, 7 and 8 are sections each showing a specific configuration of rotary optics also included in the embodiment.

In FIG. 6, the splitting element 11 is implemented as a polarizing beam splitter 20. The positional relation between the quarter-wave plate 10 and the beam splitter 20 is selected such that two linear polarizations output from the plate 10 and perpendicular to each other respectively turn out. the P wave and the S wave of the beam splitter 20. The P wave transmitted through the beam splitter 20 is reflected by the mirror 12, then transmitted through a polarizing beam splitter 22, and then condensed by the lens 13 onto the film 15 fitted on the drum 16. On the other hand, the S wave reflected by the beam splitter 20 is sequentially reflected by a mirror 21 and the beam splitter 22, and then condensed onto the film 15 by the lens 13. The distance between the two beam spots on the film 15 is controlled on the basis of the positions of the beam splitters 20 and 22 and those of the mirrors 12 and 21.

Figure 7:
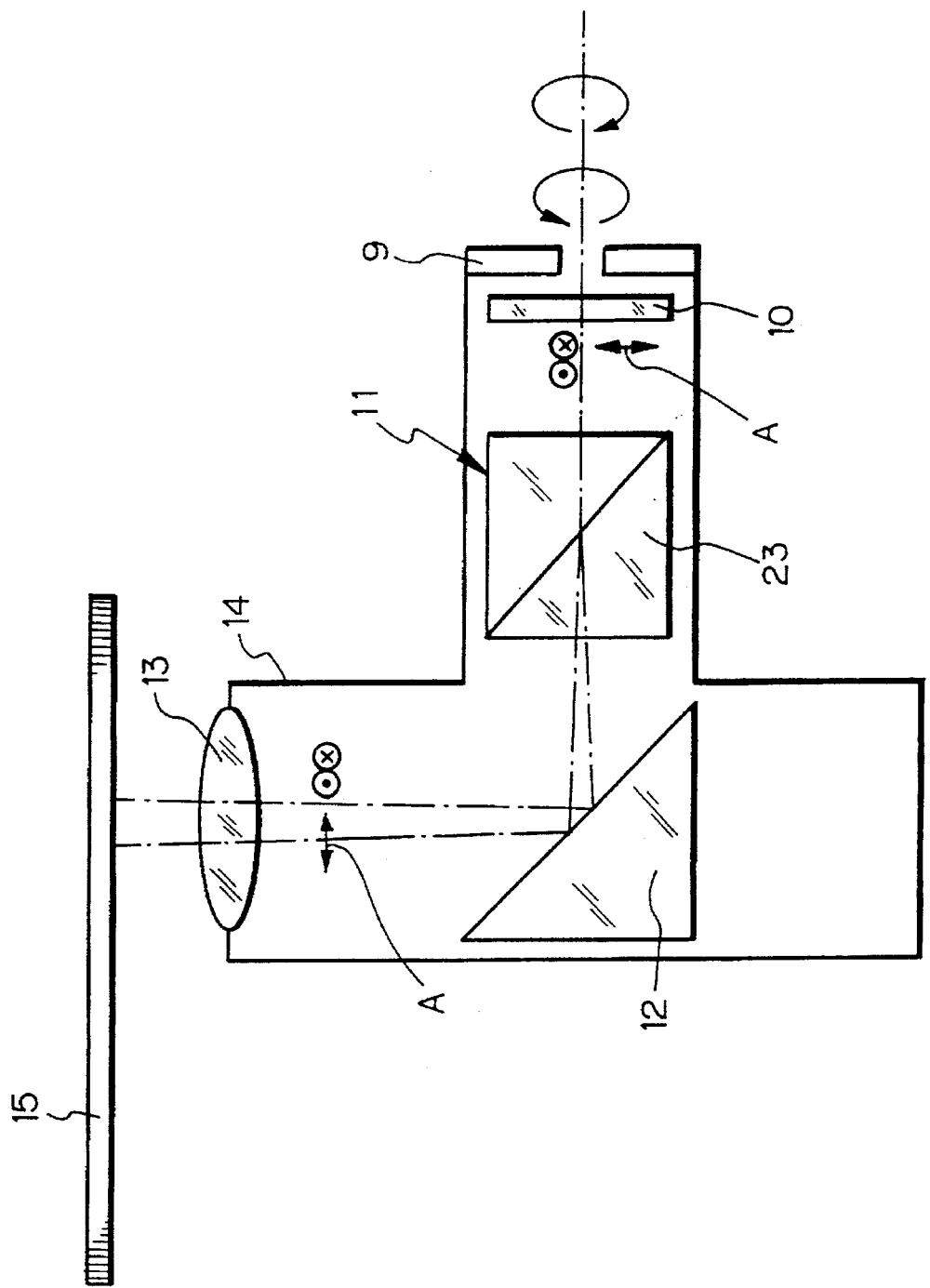

In the configuration shown in FIG. 7, the splitting element 11 is implemented by a Wollaston's prism 23. The quarter-wave plate 10 and the Wollaston's prism 23 have such a positional relation that two linear polarizations output from the plate 10 and perpendicular to each other respectively turn out ordinary rays and extraordinary rays of the prism 23. The two polarizations separated from each other by the prism 23 with respect to angle are reflected by the mirror 12 and then condensed onto the film 15 by the lens 13. The distance between the two beam sports on the film 15 is controlled on the basis of the splitting angle and the direction of optical axis of the prism 23. It should be noted that Wollaston's prism 23 may be replaced with any other suitable prism consisting of two or more double refraction crystals, e.g., a Rochon's prism or Senarmont prism. The Wollaston's prism 23 may even be replaced with a double Wollaston's prism in order to avoid unbalance in optical path length or splitting angle.

Figure 8:
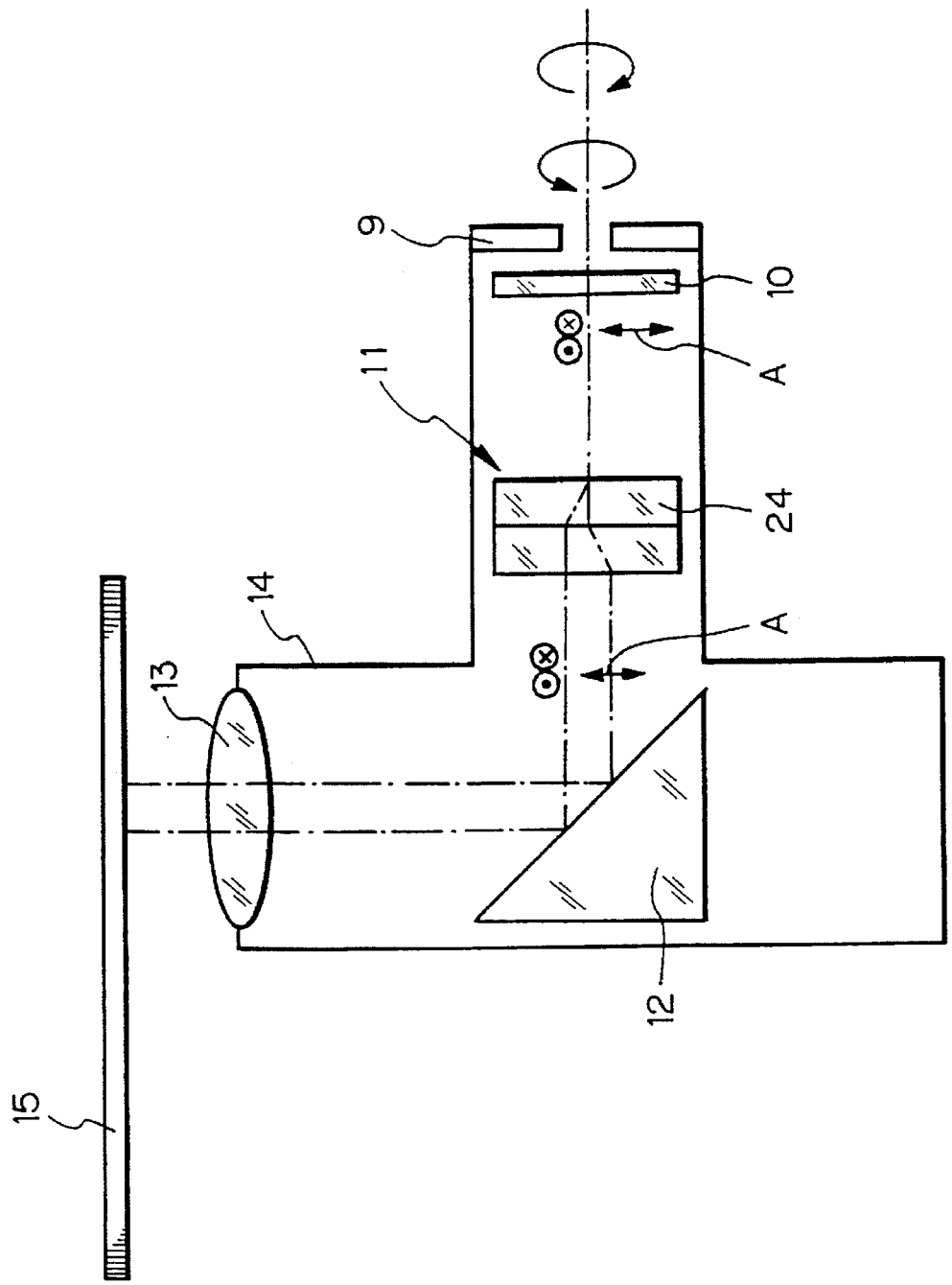

FIG. 8 shows another configuration using a Savart plate 24 as. the splitting element 11. The positional relation between the quarter-wave plate 10 and the Savart plate 24 is preselected such that two linear polarizations output from the plate 10 and perpendicular to each other respectively turn out ordinary rays and extraordinary rays of the plate 24. The two linear polarizations are separated into two beams by the Savart plate 24, then reflected by the mirror 12, and then condensed onto the film 15 by the lens 13. The distance between the two beam spots on the film 15 is adjusted on the basis of the material and thickness of the Savart plate 24. It should be noted that the Savart plate 24 may be replaced with any other suitable one or more parallel flat plates or tapered plates of double refraction crystals. For example, so long a s a difference in optical path length is not questionable, the Savart plate 24 may even be replaced with a single parallel flat plate of double refraction crystal. When it is desired to eliminate a difference in optical length and to facilitate the adjustment of the distance between the beam spots on the film 15, the Savart plate 24 may be implemented as a variable Savart plate consisting of four tapered plates of double refraction crystals. Experiments showed that any one of the above specific configurations doubles the printing speed for the same printing quality as the conventional system.

Various modifications will become possible for those skilled in the art after receiving the teachings of the present disclosure without departing from the scope thereof. For example, the present invention is practicable with the combination of any type of stationary optics and any type of rotary optics. Further, the present invention is applicable even to the previously stated arrangement lacking an aperture. The positions of the lenses shown and described are only illustrative. The crux is that the characteristic features of the present invention be combined with a lens arrangement or mirror arrangement implementing a desired characteristic. In addition, while the embodiment has concentrated on a laser printer, the present invention is similarly applicable to any other kind of image forming apparatus, e.g., a facsimile apparatus or an optical tape apparatus.

What is claimed is:

1. A mechanism for scanning an inner periphery of a hollow cylindrical drum, comprising:

rotary optics bodily rotatable for scanning the inner periphery of the drum with a beam spot; and stationary optics for feeding a laser beam to an axis of rotation of said rotary optics;

said stationary optics comprising:

two lasers perpendicular to each other in linear polarization direction;

a polarizing beam splitter for combining two beams from said two lasers on a single axis; and a quarter-wave plate for converting a composite beam, combined on said single axis, to a clockwise circular polarization and a counterclockwise circular polarization;

said rotary optics comprising:

a quarter-wave plate for converting said clockwise and counterclockwise circular polarizations incident thereto to perpendicular linear polarizations; and a splitting element for spatially splitting said perpendicular linear polarizations into two beams.

2. A mechanism as claimed in claim 1, wherein said splitting element comprises a polarizing beam splitter.

3. A mechanism as claimed in claim 1, wherein said splitting element comprises a prism made up of at least two double refraction crystals.

4. A mechanism as claimed in claim 1, wherein said splitting element comprises at least one parallel flat plate or tapered plate of double refraction crystal.

5. A mechanism as claimed in claim 1, wherein said splitting element comprises two polarizing beam splitters.

* * * * *